(12) United States Patent
Tsuiki et al.

(10) Patent No.: US 9,722,466 B2
(45) Date of Patent: Aug. 1, 2017

(54) ROTARY ELECTRIC MACHINE HAVING SHIFTED WINDING WIRE

(75) Inventors: Hironori Tsuiki, Chiyoda-ku (JP);
Shinichiro Yoshida, Chiyoda-ku (JP);
Yutaro Shirai, Chiyoda-ku (JP);
Hiroyuki Akita, Chiyoda-ku (JP);
Masaya Inoue, Chiyoda-ku (JP);
Daisuke Shijo, Chiyoda-ku (JP); Shogo Okamoto, Chiyoda-ku (JP)

(73) Assignee: MITSUBISHI ELECTRIC CORPORATION, Chiyoda-Ku, Tokyo (JP)

( * ) Notice: Subject to any disclaimer, the term of this patent is extended or adjusted under 35 U.S.C. 154(b) by 282 days.

(21) Appl. No.: 14/378,340

(22) PCT Filed: Jun. 21, 2012

(86) PCT No.: PCT/JP2012/065812
§ 371 (c)(1),
(2), (4) Date: Aug. 13, 2014

(87) PCT Pub. No.: WO2013/190673
PCT Pub. Date: Dec. 27, 2013

(65) Prior Publication Data
US 2015/0028715 A1    Jan. 29, 2015

(51) Int. Cl.
*H02K 3/18* (2006.01)
*H02K 3/52* (2006.01)
(Continued)

(52) U.S. Cl.
CPC .............. *H02K 3/18* (2013.01); *H02K 3/345* (2013.01); *H02K 3/522* (2013.01); *H02K 15/095* (2013.01); *H02K 2203/12* (2013.01)

(58) Field of Classification Search
CPC .......... H02K 3/18; H02K 3/345; H02K 3/522; H02K 3/04; H02K 15/095; H02K 2203/12
(Continued)

(56) References Cited

U.S. PATENT DOCUMENTS 4,454,492 A * 6/1984 Thackray .............. H01F 27/006
336/192
4,988,055 A * 1/1991 Sakai ....................... H01F 5/02
242/159

(Continued)

FOREIGN PATENT DOCUMENTS

CN    101179210 A    5/2008
CN    101346782 A    1/2009

(Continued)

OTHER PUBLICATIONS

International Search Report (PCT/ISA/210) mailed on Sep. 25, 2012, by the Japanese Patent Office as the International Searching Authority for International Application No. PCT/JP2012/065812.

(Continued)

*Primary Examiner* — John K Kim
*Assistant Examiner* — Minki Chang
(74) *Attorney, Agent, or Firm* — Buchanan Ingersoll & Rooney PC (57) ABSTRACT

A rotary electric machine includes a stator in which a plurality of armatures each have a coil formed by a winding wire wound in plural layers around bobbins mounted to a magnetic pole tooth, which are disposed annularly on an inner circumference of a cylindrical frame. The coil is formed by the winding wire being wound with a constant feed pitch in parallel with slots of the bobbins in plural layers. The winding wire forming a first layer of the coil is shifted by half the feed pitch between a left side and a right (Continued)

side of a center axis of the coil as viewed from a plane perpendicular to a stacking direction of a stacked iron core.

3 Claims, 8 Drawing Sheets

(51) Int. Cl.
*H02K 15/095* (2006.01)
*H02K 3/34* (2006.01)

(58) Field of Classification Search
USPC .......................... 310/179, 194, 208, 214, 215
See application file for complete search history.

(56) References Cited

U.S. PATENT DOCUMENTS

| | | | |
|---|---|---|---|
| 2004/0201303 A1 | 10/2004 | Zhang et al. | |
| 2006/0033395 A1 | 2/2006 | Izumi et al. | |
| 2008/0024029 A1* | 1/2008 | Shiono ................... | H02K 3/522 310/194 |
| 2008/0024030 A1* | 1/2008 | Saboi ..................... | H02K 3/522 310/208 |
| 2008/0111438 A1 | 5/2008 | Fujita et al. | |
| 2008/0136286 A1* | 6/2008 | Hiramatsu ............... | H02K 3/18 310/216.004 |
| 2009/0167475 A1* | 7/2009 | Asano ................... | H01F 27/2823 336/188 |
| 2009/0179725 A1* | 7/2009 | Asano ..................... | H01F 5/02 336/222 |
| 2009/0289518 A1 | 11/2009 | Fujita et al. | |
| 2011/0025163 A1* | 2/2011 | Shiobara .................. | H02K 3/18 310/198 |
| 2012/0086298 A1* | 4/2012 | Fubuki ..................... | H02K 3/18 336/222 |
| 2014/0015368 A1* | 1/2014 | Okumura ................. | H02K 3/18 310/208 |
| 2014/0028143 A1* | 1/2014 | Ishigami .................. | H02K 3/00 310/208 |

FOREIGN PATENT DOCUMENTS

| | | |
|---|---|---|
| JP | 2004-260985 A | 9/2004 |
| JP | 2005-117821 A | 4/2005 |
| JP | 2006-115565 A | 4/2006 |
| JP | 2006-296146 A | 10/2006 |
| JP | 2006-353038 A | 12/2006 |
| JP | 3980402 B2 | 9/2007 |
| WO | WO 2007/141830 A1 | 12/2007 |

OTHER PUBLICATIONS

Office Action issued on Dec. 30, 2015, by the Chinese Patent Office in corresponding Chinese Patent Application No. 201280071004.8, and an English Translation of the Office Action. (7 pages).

Office Action (Text Portion of Third Office Action) issued on Dec. 19, 2016, by the State Intellectual Property Office of China in corresponding Chinese Application No. 201280071004.8, with an English translation of the Office Action. (8 pages).

Second Office Action dated Jul. 12, 2016 issued in the corresponding Chinese Patent Application No. 201280071004.8 and English translation (7 pages).

* cited by examiner

ROTARY ELECTRIC MACHINE HAVING SHIFTED WINDING WIRE

TECHNICAL FIELD

The present invention relates to a rotary electric machine, such as an electric motor, which includes a stator having a plurality of armatures disposed annularly on an inner circumference of a cylindrical frame.

BACKGROUND ART

To date, this type of rotary electric machine has been structured as indicated in Patent Document 1. Namely, in a rotary electric machine having a stator in which a plurality of pole portions each having a coil wound therearound are annularly disposed, the coil is wound around each pole portion so as to form a left-right asymmetric cross-sectional shape on a surface perpendicular to the axis of the stator, in order to form the stator having a high coil space factor by using one kind of coil. That is, winding is performed such that, in one turn of a predetermined layer, one of left and right end portions of a winding is shifted to an adjacent layer, or such that, in one turn of a predetermined layer, left and right end portions of the winding are positioned at different positions, whereby a cross-sectional shape of the coil is formed so as to be left-right asymmetric.

CITATION LIST

Patent Document

Patent Document 1: Japanese Patent No. 3980402

SUMMARY OF THE INVENTION

Problems to be Solved by the Invention

In such a conventional art, winding is performed so as to fill a gap formed between coils adjacent to each other, and therefore, in some of turns, a feed pitch may become greater than feed pitches in the other turns.

In the example of Patent Document 1, a maximum feed pitch is required to be about 2.5 times greater than a standard feed pitch.

When the feed pitch is increased, a winding rate is reduced due to limitation on an acceleration in a coil center axis direction of a winding machine.

The present invention is made in order to solve the aforementioned problem, and an object of the present invention is to provide a rotary electric machine having a stator in which a feed pitch is maintained small in every turn, interference with an adjacent magnetic pole tooth is prevented, and a coil space factor can be enhanced.

Solution to the Problems

The present invention is directed to a rotary electric machine including a stator in which a plurality of armatures each have a stacked iron core which includes a magnetic pole tooth formed so as to project from a yoke portion and having a rectangular longitudinal cross-section, in which the plurality of armatures each have a coil formed by a winding wire being wound around a bobbin mounted to the magnetic pole tooth, and in which the plurality of armatures are disposed annularly on an inner circumference of a cylindrical frame, and, in the rotary electric machine, the coil is formed by the winding wire being wound with a constant feed pitch P in parallel with a slot of the bobbin in plural layers, and the winding wire forming a first layer of the coil is shifted, by P/2 which is half the feed pitch between a left side of and a right side of a center axis of the coil as viewed from a plane perpendicular to a stacking direction of the stacked iron core.

Effect of the Invention

By the rotary electric machine according to the present invention, a stator can be obtained in which a feed pitch can be maintained small in every turn, interference with an adjacent magnetic pole tooth can be prevented, and a coil space factor can be enhanced. Thus, an advantageous effect which cannot be obtained in conventional arts can be obtained.

DESCRIPTION OF EMBODIMENTS

Embodiment 1

Figure 1:
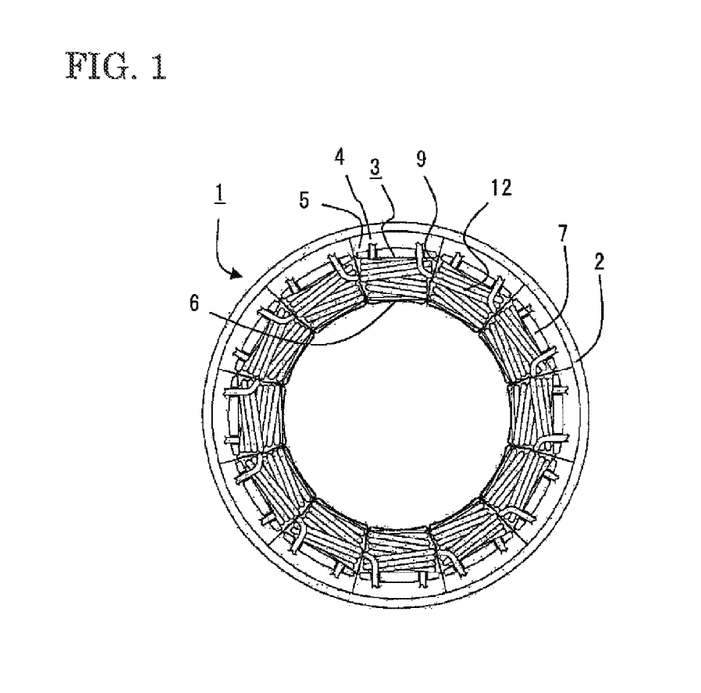
FIG. 1 is a top view of a stator of an electric motor according to embodiment 1 of the present invention.

FIG. 1 is a top view of a stator of an electric motor according to embodiment 1 of the present invention.

In FIG. 1, a stator 1 includes a cylindrical metal frame 2, and a plurality of armatures 3 that are annularly arranged on an inner circumference of the frame.

Each armature 3 includes a yoke portion 5, a stacked iron core 4 having a magnetic pole tooth 6 that projects from the yoke portion 5, bobbins 7, 8, insulating paper sheets 9, and a coil 10.

A cross section, of the magnetic pole tooth 6, which is a longitudinal cross-section and parallel to the yoke portion 5, is rectangular.

Figure 2:
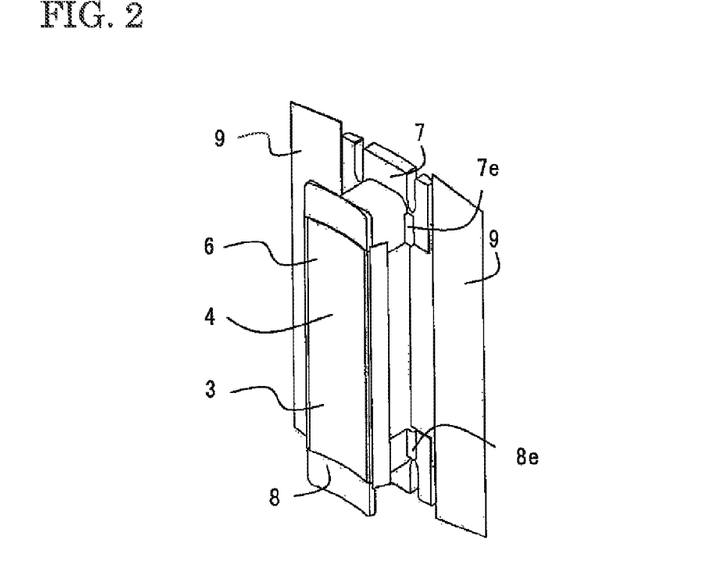
FIG. 2 is a perspective view of an assembled structure of an armature according to embodiment 1.
Figure 3:
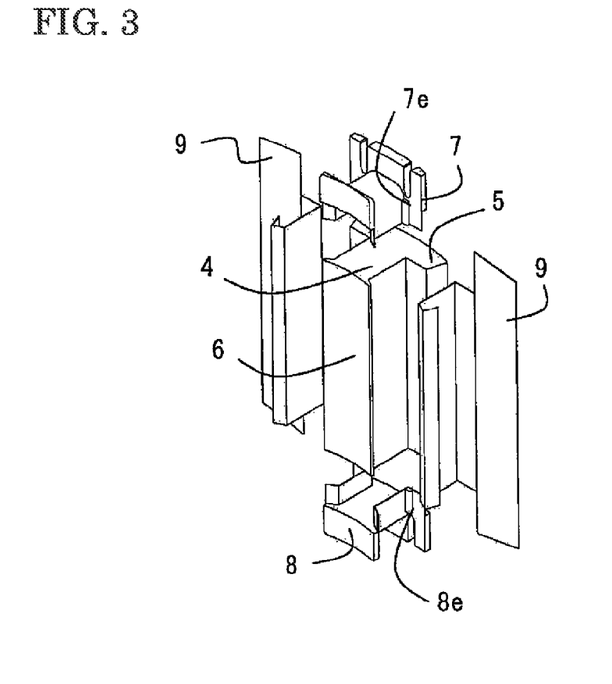
FIG. 3 is an exploded perspective view of the armature according to embodiment 1.

FIG. 2 is a perspective view of the armature 3 which does not have the coil 10 wound therearound. FIG. 3 is an exploded perspective view of the stacked iron core 4, the bobbins 7, 8, and the insulating paper sheets 9 of the armature 3.

The armature 3 is assembled, as shown in FIG. 3, such that the bobbins 7, 8 are mounted to both ends, in the longitudinal direction, of the magnetic pole tooth 6 from a stacking direction of the stacked iron core 4, and thereafter, the insulating paper sheets 9 are interposed between the bobbins 7, 8 and the stacked iron core 4, to wind, from thereabove, the coil 10 around the magnetic pole tooth 6.

Figure 4:
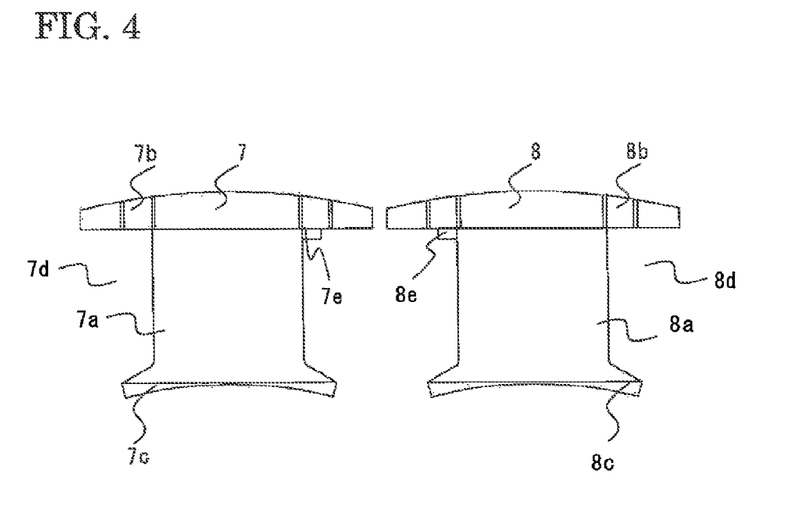
FIG. 4 is a top view of a bobbin according to embodiment 1.

The bobbins 7, 8 are formed of a resin, made of a polyphenylenesulfide, an LCP, or the like, exhibiting a good formability, insulate the stacked iron core 4 and the coil 10 from each other, and form a winding frame of the coil 10. The bobbins 7, 8 are formed so as to be line-symmetric as shown in FIG. 4, and include: U-shaped coil winding portions 7a, 8a, respectively; and flanges 7b, 7c, 8b, 8c provided so as to be perpendicular, on end surfaces, on both sides, of the coil winding portions 7a, 8a. The coils 10 are wound in a slot 7d formed between the flanges 7b and 7c and a slot 8d formed between the flanges 8b and 8c as described below Each insulating paper sheet 9 is formed of an insulating material such as a meta-aramid fiber or a polyphenylenesulfide, and assuredly insulates the stacked iron core 4 and the coil 10 from each other.

Figure 5:
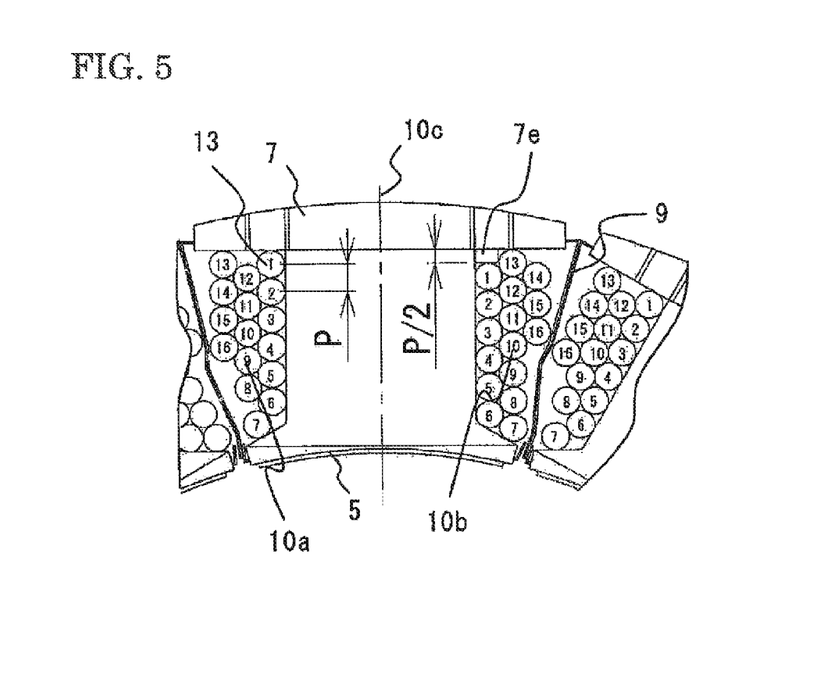
FIG. 5 is a fragmentary cross-sectional view of a winding pattern according to embodiment 1.

The coil 10 is formed by a winding wire 13 being wound with a constant feed pitch P in parallel with the slots 7d, 8d of the bobbins 7, 8 in plural layers, as shown in FIG. 5.

The feed pitch P can be set so as to satisfy d≤p≤2d (where d represents a diameter of the winding wire 13), and FIG. 5 shows a state where winding is performed with the feed pitch P=d.

The winding pattern represents a structure in which, in the first layer, a coil right side portion 10b is shifted from a coil left side portion 10a, by P/2, with reference to a center axis 10c of the coil 10 as viewed from a plane perpendicular to the stacking direction of the stacked iron core 4.

The first layer is an innermost layer of the coil 10, and is a coil that is firstly wound from the yoke portion 5 side toward the inner circumferential side of the stator 1.

Figure 6:
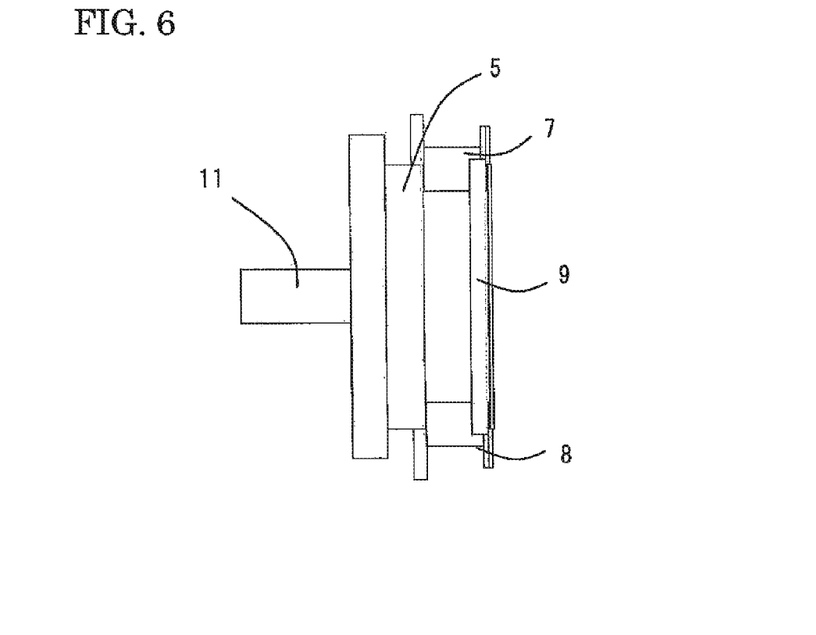
FIG. 6 is a schematic diagram illustrating the armature mounted to a winding machine according to embodiment 1.

Next, a method for winding the coil 10 will be described. As shown in FIG. 6, the yoke portion 5 of the stacked iron core 4 is mounted to a main shaft 11 of the winding machine.

Figure 7:
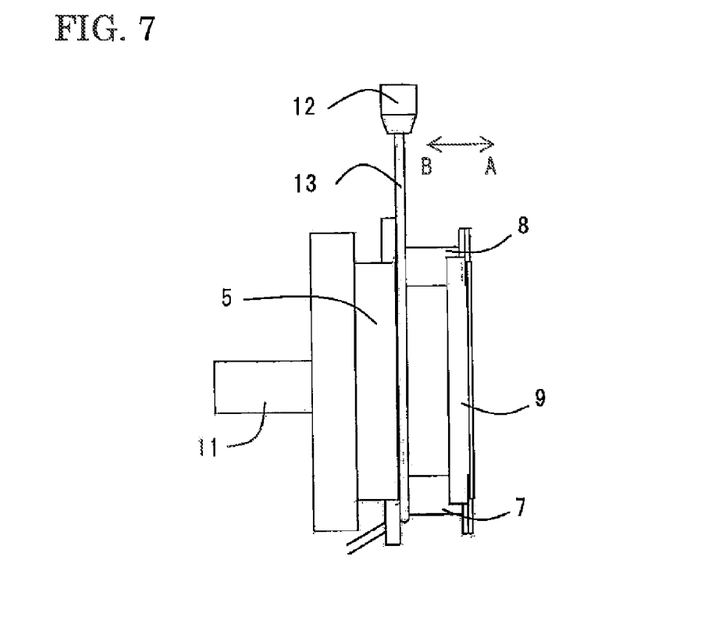
FIG. 7 is a schematic diagram illustrating a winding method by the winding machine according to embodiment 1.

Thereafter, as shown in FIG. 7, while the main shaft 11 of the winding machine is being rotated, the winding wire 13 fed from a nozzle 12 is wound by means of the magnetic pole tooth 6 having the bobbins 7, 8 mounted thereto.

Winding is performed such that the winding wire 13 is firstly introduced in the bobbin 7, and is thereafter wound toward the bobbin 8 in parallel with a long side portion of the magnetic pole tooth 6. When the winding wire 13 is wound around the bobbin 8 that is a short side portion of the magnetic pole tooth 6, the nozzle 12 is moved in the direction indicated by an arrow A in FIG. 7, to feed the winding wire 13 by P/2.

Figure 8:
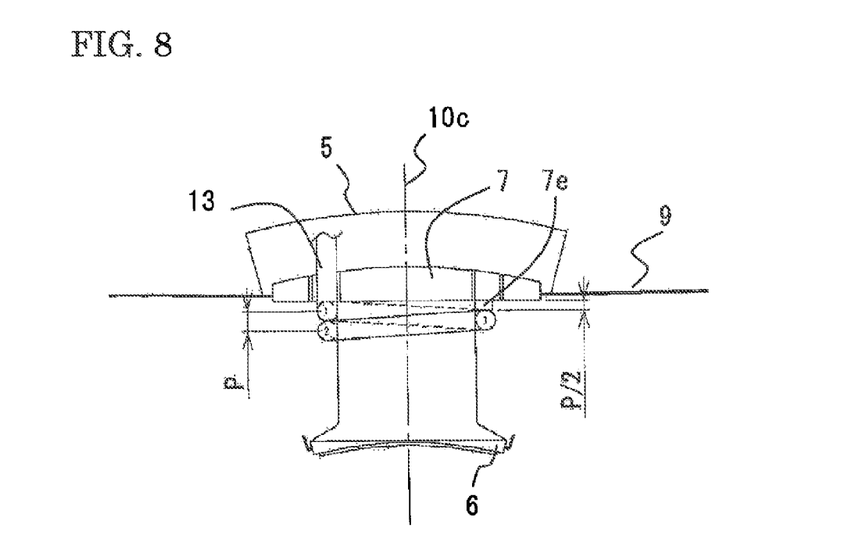
FIG. 8 illustrates a winding that shifts from the first turn to the second turn according to embodiment 1.

Next, winding is performed toward the bobbin 7 in parallel with the long side portion of the magnetic pole tooth 6. When the winding wire 13 is wound around the bobbin 7 that is a short side portion of the magnetic pole tooth 6, the nozzle 12 is moved in the direction indicated by the arrow A in FIG. 7, to feed the winding wire 13 by P/2, thereby performing the first turn of winding (FIG. 8).

Figure 9:
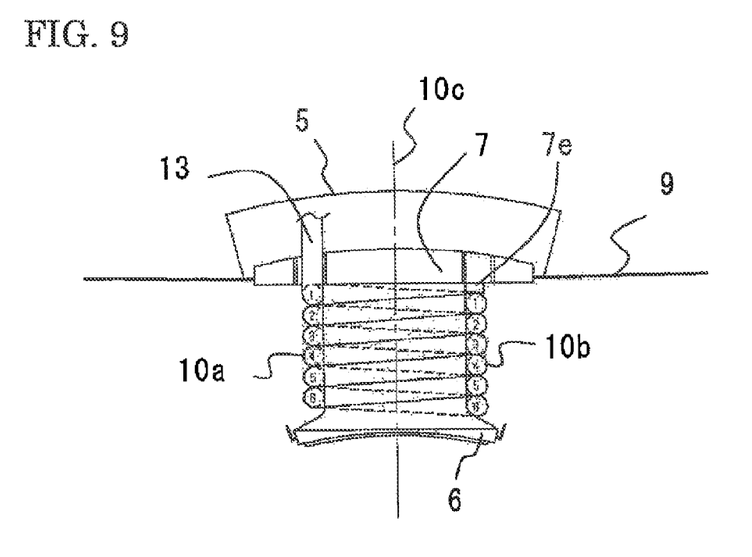
FIG. 9 illustrates the first layer of the winding according to embodiment 1.

Thereafter, the second turn and the third turn of the winding are similarly performed, and the winding up to the end of the magnetic pole tooth 6 is performed, to form the first layer (FIG. 9).

When the winding is thus performed, the coil right side portion 10b can be shifted from the coil left side portion 10a by P/2 in the first layer with reference to the center axis 10c of the coil 10 as viewed from the plane perpendicular to the stacking direction of the stacked iron core 4.

The bobbins 7, 8 include projections 7e, 8e in portions where the first turn of the coil is wound, in order to stably shift the coil left side portion 10a and the coil right side portion 10b from each other by P/2.

After the first layer has been wound, return in the direction indicated by an arrow B in FIG. 7 is performed, to perform winding of the second layer. The windings of the second layer and the subsequent layers are performed according to the wire of the first layer so as to repeat the feeding at coil ends on both side ends such that the wire is staggered.

Thus, by the winding of the first layer being shifted by P/2, the winding pattern can be changed between the coil left side portion 10a and the coil right side portion 10b with reference to the center axis 10e of the coil 10, as shown in FIG. 5.

Further, a distance over which the feeding is performed at the coil ends on both the side ends is almost constant, and is less than or equal to 1.5 times the feed pitch P.

As described above, according to the present invention, the rotary electric machine includes the stator 1 in which a plurality of the armatures 3 each have the stacked iron core 4 which includes the magnetic pole tooth 6 formed so as to project from the yoke portion 5 and having a rectangular longitudinal cross-section, in which the plurality of the armatures 3 each have the coil 10 formed by the winding wire 13 being wound around the bobbins 7, 8 mounted to the magnetic pole tooth 6 in plural layers, and in which the plurality of the armatures 3 are disposed annularly on the inner circumference of the cylindrical frame 2. In the rotary electric machine, the coil 10 is formed by the winding wire 13 being wound with the constant feed pitch P in parallel with the slots 7d, 8d of the bobbins 7, 8 in plural layers, and the winding wire 13 that forms the first layer of the coil 10 is shifted, by P/2 that is half the feed pitch P, between the left of and the right of the center axis 10c of the coil 10 as viewed from the plane perpendicular the stacking direction of the stacked iron core 4.

Figure 15:
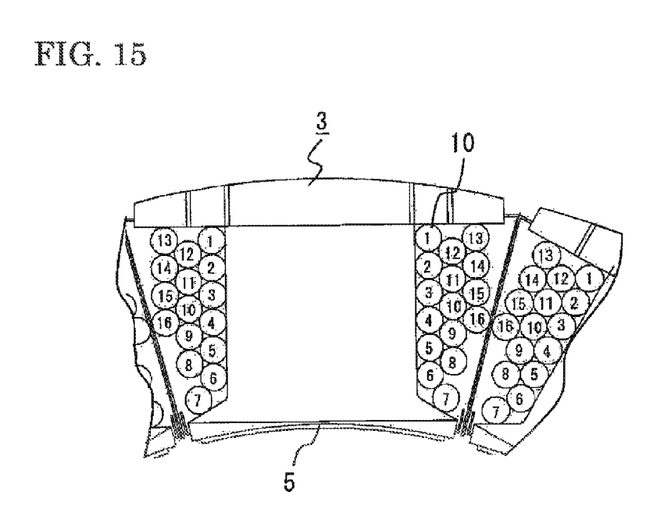
FIG. 15 is a fragmentary cross-sectional view of a winding pattern to which the present invention is not applied.

In such a structure, as compared to a winding structure in which shift by P/2 is not performed as shown in FIG. 15, a feeding amount can be maintained small, and interference with a coil wound around an adjacent magnetic pole tooth is prevented, and likelihood is obtained with respect to the circumferential direction of the stator, and likelihood is enhanced with respect to winding expansion or a wire diameter of the winding wire can be enhanced to enhance a coil space factor.

Further, the winding of the first layer is shifted by P/2 between the left of and the right of the center axis of the coil, to enable prevention of interference with the coil of the adjacent magnetic pole tooth, and therefore likelihood can be enhanced with respect to the winding expansion or a coil space factor can be enhanced.

Further, the bobbin has the projection that has a size corresponding to about half the feed pitch P, in one of portions, to the left of and to the right of the center axis of the coil, where the first turn of the coil is wound, whereby a gap of half the pitch P/2 can be formed between the first turn of the winding and the flange portion of the bobbin.

Therefore, even when the winding wire of the first turn is pressed by the winding wires of the second turn and/or the subsequent turns, shift by half the pitch P/2 can be maintained.

Embodiment 2

Figure 10:
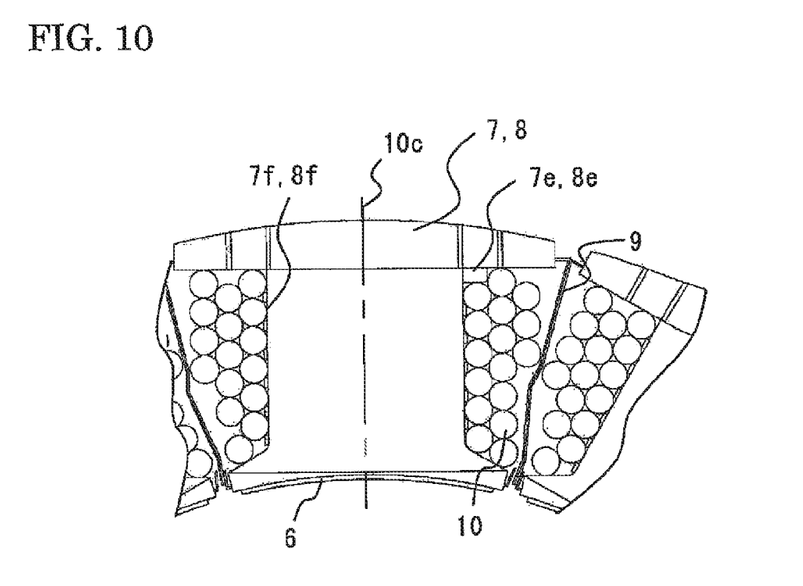
FIG. 10 is a fragmentary cross-sectional view of a winding pattern according to embodiment 2 of the present invention.
Figure 11:
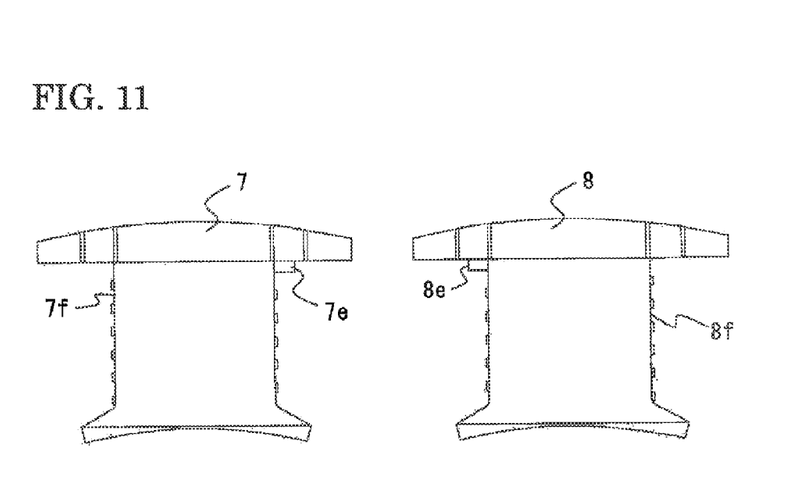
FIG. 11 is a top view of a bobbin according to embodiment 2.

FIG. 10 is a fragmentary cross-sectional view of a winding pattern according to embodiment 2 of the present invention. FIG. 11 is a top view of bobbins according to embodiment 2.

In embodiment 2, the coil winding portions 7a, 8a of the bobbins 7, 8 have grooves 7f, 8f for guiding the winding wire 13.

The grooves 7f, 8f are each formed such that the grooves on the right side are shifted, by P/2, from the grooves on the left side with reference to the center axis 10c of the coil 10.

The bobbins 7, 8 mounted to both ends of the magnetic pole tooth 6 are formed so as to be line-symmetric (FIG. 11).

Thus, when the bobbins 7, 8 have the grooves 7f, 8f, the winding wire 13 can be more stably wound with shift by half the pitch P/2.

Further, when the feed pitch P is greater than or equal to the wire diameter of the winding wire 13, a gap from the coil of the adjacent magnetic pole tooth can be further increased, to enhance likelihood with respect to the winding expansion or enhance a coil space factor.

Embodiment 3

Figure 12:
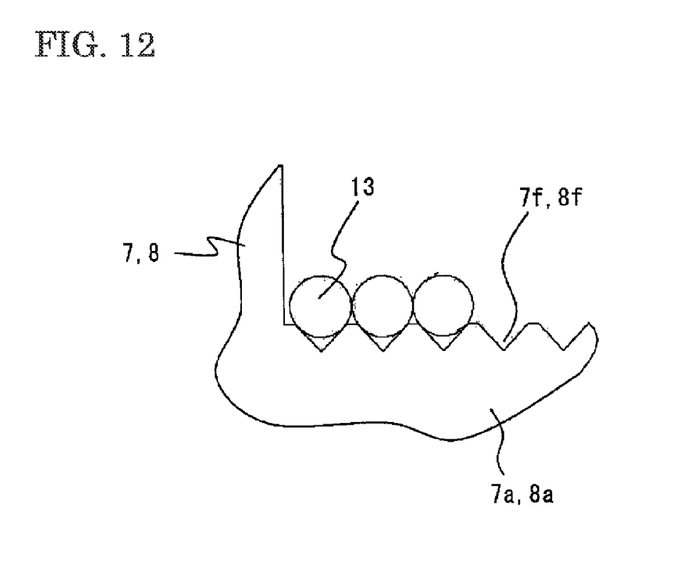
FIG. 12 is a schematic diagram illustrating grooves formed in a bobbin according to embodiment 3 of the present invention.

FIG. 12 is a schematic cross-sectional view of coil winding portions of the bobbins 7, 8 according to embodiment 3 of the present invention. In the present embodiment, the grooves 7f, 8f of the bobbins 7, 8 are V-shaped.

When the grooves 7f, 8f are thus V-shaped, the winding wire 13 can be stably wound at predetermined positions of the bobbins 7, 8, thereby performing winding with enhanced stability.

Embodiment 4

Figure 13:
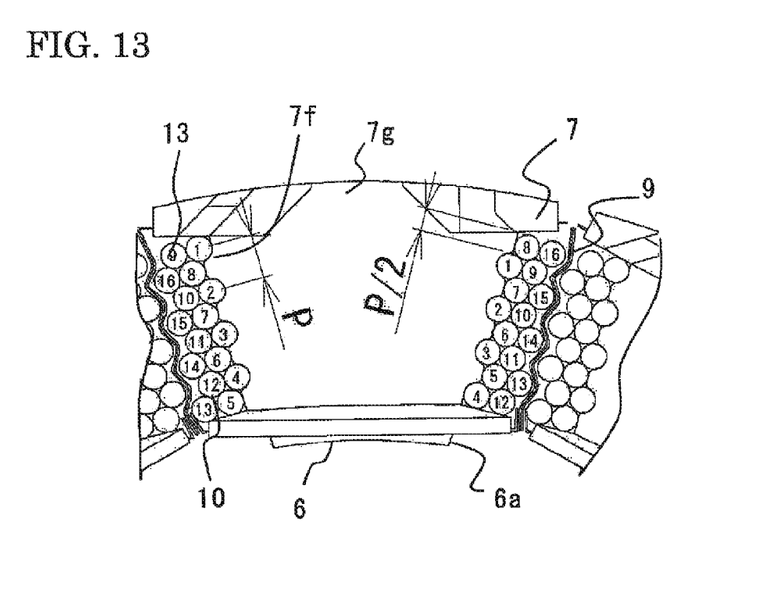
FIG. 13 is a fragmentary cross-sectional view of a winding pattern according to embodiment 4 of the present invention.

FIG. 13 illustrates a winding pattern according to embodiment 4 of the present invention, and illustrates an exemplary structure in which the magnetic pole tooth 6 has, on the side surfaces in the longitudinal direction, a tapered portion 6a that is wider toward the yoke portion 5.

Thus, when winding on the magnetic pole tooth 6 having the tapered portion 6a is performed, the winding wire 13 of one turn and the wining wire 13 of the turn immediately following or preceding the one turn geometrically interfere with each other. Therefore, the winding wire 13 needs to be wound with a space in order to stably perform the winding.

Therefore, the feed pitch P becomes greater than a wire diameter of the winding wire 13. FIG. 13 illustrates an arrangement that satisfies P=d·√3 (d represents the diameter of the winding wire 13). In this case, when, for example, the wire diameter d of the winding wire 13 is 2.5 mm, the feed pitch P is 4.33 mm, and a coil space factor is increased to 45.9% although a coil space factor is 38.9% in conventional arts.

Figure 14:
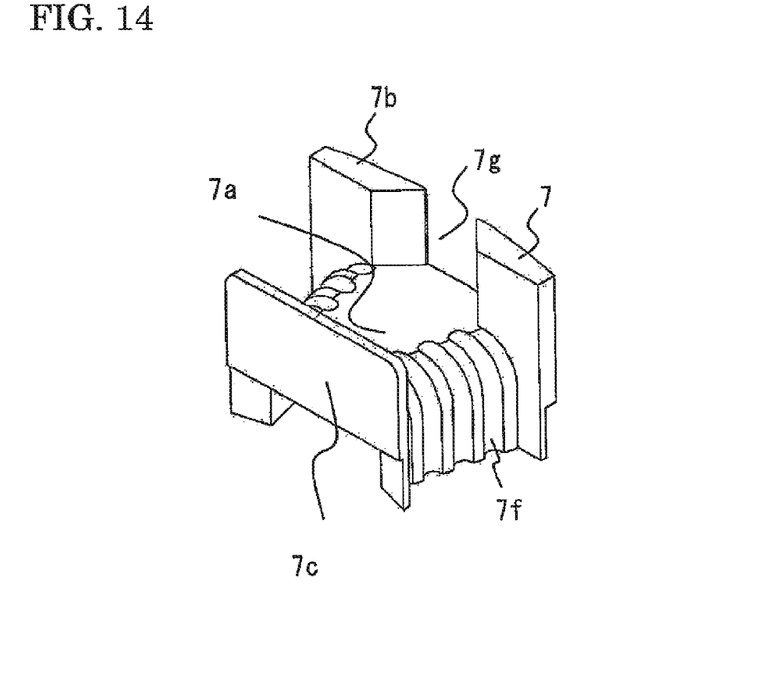
FIG. 14 is a perspective view of a bobbin according to embodiment 4.

Further, in this case, each of the bobbins 7, 8 has a shape corresponding to the tapered portion 6a of the magnetic pole tooth 6, and at least one of bobbins, e.g., the bobbin 7 has an opening 7g through which a winding wire is introduced in the flange 7b on the yoke portion side as shown in FIG. 14.

The winding wire is introduced through the opening 7g of the flange formed in the bobbin 7 so as not to interfere with the wire of the second layer and/or the subsequent layers.

Also in such a winding, when the coil of the first layer is shifted by P/2 between the left side and the right side as shown in FIG. 14, a gap is formed between the coils adjacent to each other, whereby the same effect as that for embodiment 1 can be obtained.

It is noted that, within the scope of the present invention, the above embodiments may be freely combined with each other, or each of the above embodiments may be modified or abbreviated as appropriate.

DESCRIPTION OF THE REFERENCE CHARACTERS 1 stator
2 frame
3 armature
4 stacked iron core
5 yoke portion
6 magnetic pole tooth
6a tapered portion
7, 8 bobbin
7a, 8a coil winding portion
7b, 8b flange
7c, 8c flange
7d, 8d slot
7e, 8e projection
7f, 8f groove
7g opening
9 insulating paper sheet
10 coil
10a coil left side portion
10b coil right side portion
10c center axis
11 main shaft of winding machine
12 nozzle
13 winding wire

The invention claimed is:

1. A rotary electric machine including a stator in which a plurality of armatures each have a stacked iron core which includes a magnetic pole tooth formed so as to project from a yoke portion and having a rectangular shape, in which the plurality of armatures each have a coil formed by a winding wire being wound around a bobbin mounted to the magnetic pole tooth, and in which the plurality of armatures are disposed annularly on an inner circumference of a cylindrical frame, wherein the coil is formed by the winding wire being wound with a constant feed pitch P in parallel with a slot of the bobbin in plural layers, the feed pitch being equal to d·√3, where d is a wire diameter of the winding wire, and the winding wire forming a first layer of the coil is shifted, by P/2 which is half the feed pitch P, between a left side of and a right side of a center axis of the coil as viewed from a plane perpendicular to a stacking direction of the stacked iron core.

2. The rotary electric machine according to claim 1, wherein the magnetic pole tooth has, on side surfaces in the axial direction, a tapered portion that is expanded toward the yoke portion.

3. The rotary electric machine according to claim 2, wherein the bobbin has a shape corresponding to the tapered portion, and has an opening through which the winding wire is introduced in a flange on the yoke portion side.

\* \* \* \* \*